United States Patent [19]

Lorenz et al.

[11] Patent Number: 4,528,323

[45] Date of Patent: Jul. 9, 1985

[54] PROCESS FOR THE PREPARATION OF AQUEOUS DISPERSIONS OF POLYURETHANES CONTAINING CHEMICALLY FIXED CARBOXYLATE AND/OR SULPHONATE GROUPS

[75] Inventors: Otto Lorenz; Gerd Rose, both of Aachen, Fed. Rep. of Germany

[73] Assignee: Bayer Aktiengesellschaft, Leverkusen, Fed. Rep. of Germany

[21] Appl. No.: 488,329

[22] Filed: Apr. 25, 1983

[30] Foreign Application Priority Data

May 4, 1982 [DE] Fed. Rep. of Germany ....... 3216567

[51] Int. Cl.$^3$ ..................... C08L 75/04; C08L 75/12; C08G 18/10
[52] U.S. Cl. .................................... 524/839; 524/591
[58] Field of Search ....................... 524/591, 839, 840

[56] References Cited

U.S. PATENT DOCUMENTS

| 3,479,310 | 11/1969 | Dieterich et al. | 525/457 |
| 4,108,814 | 8/1978 | Reiff et al. | 524/840 |
| 4,385,171 | 5/1983 | Schnabel | 528/491 |

FOREIGN PATENT DOCUMENTS

| 1076688 | 7/1967 | United Kingdom . |
| 1101410 | 1/1968 | United Kingdom . |
| 1305880 | 2/1973 | United Kingdom . |
| 1336050 | 11/1973 | United Kingdom . |

OTHER PUBLICATIONS

Dieterich et al.; "Aqueous Polyurethane Systems and Their Possible Uses;" Adhesives Age; Feb. 1978; (pp. 24-28).

D. Dieterich et al., Angew. Chem. 82, 1970, pp. 53 et seq.

D. Dieterich, Die Angew. Makromol. Chem. 98, 1981, pp. 133 et seq.

*Primary Examiner*—C. Warren Ivy
*Attorney, Agent, or Firm*—Gene Harsh; Joseph C. Gil; Thomas W. Roy

[57] ABSTRACT

The present invention relates to a process for the preparation of aqueous dispersions of polyurethanes containing chemically fixed carboxylate and/or sulphonate groups which comprises reacting (i) isocyanate prepolymers based on organic polyhydroxyl compounds and monomeric diisocyanates, having an isocyanate content of from 1.5 to 8% by weight and containing less than 1.2% by weight of monomeric diisocyanates with (ii) organic diaminocarboxylates and/or organic diaminosulphonates and/or organic dihydroxy carboxylates and/or organic dihydroxy sulphonates and optionally other chain-lengthening agents which have hydroxy or amino groups and which are free from salt groups in the aqueous or organic phase optionally with subsequent addition of water and optionally subsequent removal of solvent, using an equivalent ratio of isocyanate groups to amino and/or hydroxy groups in the range of from about 1:1.2 to 1:0.05, optionally with the addition of further quantities of water, the nature and quantitative proportions of the reactants being chosen so that the resulting polyurethane has a carboxylate and/or sulphonate group content of from about 2 to 80 milliequivalents per 100 g of polyurethane solids.

11 Claims, No Drawings

PROCESS FOR THE PREPARATION OF AQUEOUS DISPERSIONS OF POLYURETHANES CONTAINING CHEMICALLY FIXED CARBOXYLATE AND/OR SULPHONATE GROUPS

BACKGROUND OF THE INVENTION

1. Field of the Invention

The present invention relates to a new process for the preparation of aqueous dispersions of polyurethanes containing chemically fixed carboxylate and/or sulphonate groups by the reaction of prepolymers containing free isocyanate groups with organic diaminocarboxylates and/or organic diaminosulphonates and/or organic dihydroxycarboxylates and/or organic dihydroxysulphonates in the aqueous or organic phase using isocyanate prepolymers which are virtually free from free monomeric diisocyanates.

2. Description of the Prior Art

Numerous processes are already known for the preparation of aqueous dispersions of ionically modified polyurethanes (see e.g. D. Dieterich et al, Angew. Chem. 82, (1970), pages 53 et seq or D. Dieterich, Die Angew. Makromol. Chem. 98 (1981), pages 133 et seq and the publications cited in these writings). One particularly simple method of preparing such dispersions comprises reacting isocyanate prepolymers based on organic polyhydroxyl compounds and monomeric diisocyanates in the aqueous or aqueous/organic phase with diaminocarboxylates and/or diaminosulphonates and optionally removing any organic solvent present by distillation after the reaction (see e.g. German Auslegeschrift No. 1,495,847 or German Offenlegungsschrift No. 2,035,732). In these methods known in the art, the isocyanate prepolymers used are reaction products of organic polyhydroxyl compounds with excess quantities of monomeric diisocyanates. These reaction products invariably contain a considerable quantity of free, unreacted monomeric diisocyanate even when only a small diisocyanate excess is used, so that when the prepolymers are reacted with the diaminocarboxylates or sulphonates, the formation of high molecular weight ionically modified polyurethanes is accompanied by the formation of polyelectrolytes with a high concentration of ionic centers formed as by-products due to the reaction of the monomeric diisocyanates with ionic chain lenthening agents. Polyelectrolytes generally lead to an increase of the particle size of the dispersed polyurethanes which increase is generally considered disadvantageous.

It has now been found that the properties of the aqueous polyurethane dispersions, in particular the mechanical properties of the sheet products obtained from them, can be substantially improved if the proportion of such polyelectrolytes in the dispersions is kept as low as possible. A further advantage of a low content of polyelectrolytes is to be seen in the fact that dispersions having a relatively high content of solids may be prepared. The low content of polyelectrolytes can be adchieved by freeing the isocyanate prepolymers used as starting components as completely as possible from their monomeric diisocyanate content before they are put into the reaction.

SUMMARY OF THE INVENTION

The present invention relates to a process for the preparation of aqueous dispersions of polyurethanes containing chemically fixed carboxylate and/or sulphonate groups which comprises reacting (i) isocyanate prepolymers based on organic polyhydroxyl compounds and monomeric diisocyanates having an isocyanate content of from 1.5 to 8% by weight and containing less than 1.2% by weight of monomeric diisocyanates with (ii) organic diaminocarboxylates and/or organic diaminosulphonates and/or organic dihydroxy carboxylates and/or organic dihydroxy sulphonates and optionally other chain-lenthening agents which have hydroxy or amino groups and which are free from salt groups in the aqueous or organic phase optionally with subsequent addition of water and optionally subsequent removal of solvent, using an equivalent ratio of isocyanate groups to amino and/or hydroxy groups in the range of from about 1:1.2 to 1:0.05, optionally with the addition of further quantities of water, the nature and quantitative proportions of the reactants being chosen so that the resulting polyurethane has a carboxylate and/or sulphonate group content of from about 2 to 80 milliequivalents per 100 g of polyurethane solids.

DETAILED DESCRIPTION OF THE INVENTION

The isocyanate prepolymers to be used as component (i) in the process according to the invention are prepared by the known methods of the art, using the known starting materials. Suitable organic polyhydroxyl compounds include in particular substantially linear polyester or polyether polyols having molecular weights calculated from the hydroxyl group content of from about 300 to 10,000, preferably from about 500 to 4,000, such as those described, for example, in German Auslegeschrift No. 1,495,847, herein incorporated by reference, at column 2, line 58 to column 3, line 19. Suitable monomeric diisocyanates are, for example, the diisocyanates free from urethane groups of the type mentioned in German Auslegeschrift No. 1,495,847, column 3, lines 30–44. Hexamethylene diisocyanate, 4,4'-diisocyanatodicyclohexylmethane and isophorone diisocyanate are particularly suitable. The isocyanate prepolymers are prepared by reaction of the individual components at an NCO/OH equivalent ratio of at least about 1.2:1, preferably from about 1.5:1 to 2.5:1, at temperatures, for example, of about 20°–150° C., preferably about 70°–130° C. Even when only a small diisocyanate excess is used, this method invariably results in mixtures of isocyanate prepolymers with unreacted monomeric diisocyanate. The proportion of monomeric diisocyanate present is always above 1.4% by weight. It is an essential feature of this invention that for carrying out the process according to the invention, the isocyanate prepolymers obtained in this manner should be substantially freed from monomeric diisocyanate. This may be achieved by, for example, thin layer distillation or extraction. The monomeric diisocyanate is preferably removed by thin layer distillation, optionally using a vehicle and optionally carrying out the distillation in an inert gas atmosphere, for example at a temperature of about 80° to 200° C. and a pressure of about 0.1 to 2 mbar. The temperature and pressure conditions, however, are not essential provided only that care is taken to ensure that the monomeric diisocyanate is removed down to a residue of less than 1.2% by weight, preferably less than about 0.9 by weight. The isocyanate prepolymers do preferably not contain any ionic groups.

The resulting prepolymer substantially freed from monomer is then converted by methods known in the art into the high molecular weight polyurethane or polyurethane-polyurea by reaction with diaminocarboxylates and/or sulphonates and/or dihydroxy carboxylates and/or dihydroxy sulphonates and optionally other chain lengthening agents carrying amino and/or hydroxy groups and free from salt groups in an aqueous or organic phase. "aqueous phase" means that the reaction is either carried out in water or in a mixture of water with water miscible solvents such as e.g. acetone; "organic phase" means that the reaction is either carried out in the presence of organic solvents such as e.g. acetone, N-methyl-pyrrolidone or toluene or in the absence of solvents i.e. in the melt.

Suitable ionic diamines of this kind include, for example, the salts obtained by neutralization of the diamino carboxylic acids or diamino sulphonic acids exemplified in German Auslegeschrift No. 1,495,847 in columns 4–5 under 2. and 4. with the bases exemplified in German Auslegeschrift No. 1,495,847, column 5, under 1. and 2. The N-(ω-aminoalkane)-ω'-aminoalkane sulphonic acid salts mentioned in German Offenlegungsschrift No. 2,035,732 are also particularly suitable. Suitable ionic dihydroxy compounds include for examples the diol sulphonates disclosed in U.S. Pat. No. 4,108,814 e.g. the propoxylation product of the adduct of sodium disulphite and 1,4-dihydroxy-butene-(2) having a molecular weight of about 425, the salts of dimethylol propionic acid or tartaric acid with inorganic or organic bases especially tertiary amines such as triethyl amine. According to one embodiment of the process of the invention which is fully equivalent to the use of the last mentioned carboxylates the free acids (dimethylol propionic acid or tartaric acid) are used as reactant for the NCO-prepolymers with subsequent neutralisation of the carboxyl groups. Mixtures of various ionic starting components of the type mentioned by way of example may, of course, also be used so that, for example, the reaction products obtained may contain both carboxylate and sulphonate groups.

Suitable chain lengthening agents free from salt groups and containing amino groups, which may be used together with the above-mentioned ionic dihydroxy compounds or diamines, include, for example, hydrazine and organic polyamines such as those mentioned as chain lengthening agents, for example, in German Offenlegungsschrift No. 2,651,506 or U.S. Pat. No. 4,237,264, herein incorporated by reference. Among these compounds, diamines such as ethylenediamine, isophorone diamine and 2- and/or 4-methyl-1,3-diaminocyclohexane are preferred but a certain proportion of higher functional polyamines such as diethylenetriamine may also be included, preferably only in quantities resulting in average functionality of all the starting components not greater than about 2.2. Suitable chain lengthening agents free from salt groups and containing hydroxy groups, which may be used together with the above mentioned ionic dihydroxy compounds or diamines include, for example, ethylene glycol, 1,2-dihydroxy-propane or 1,6-dihydroxy-hexane.

Non-ionic chain lengthening agents, if used at all, are only used in quantities of up to about 80 equivalents percent, preferably up to about 60 equivalents percent, based on the isocyanate groups of component (i).

The quantity of component (ii) i.e. of the ionic starting components and of any non-ionic lengthening agents which are free from salt groups is also calculated so that the equivalent ratio of isocyanate groups to amino and/or hydroxy groups is from about 1:1.2 to 1:0.05 preferably from about 1:0.9 to 1:0.1 and the ionic group content in the resulting polyurethane is from about 2 to 80, preferably from about 2 to 40, and in particular about 2.5 to 15 milliequivalents per 100 g of polyurethane solids.

When carrying out the process according to the invention using ionic diamines, the ionic starting components (ii) are generally used in the form of aqueous solutions although it would be possible in principle to dissolve the ionic starting components in an aqueous-/organic medium, for example in aqueous acetone. The isocyanate prepolymers may be used in the process according to the invention as a solvent-free melt, but preferably in the form of an organic, in particular, an acetonic solution. The ionic starting components may be dissolved in the total quantity of water finally present in the dispersion or in only a part thereof. Components (i) and (ii) are mixed together by stirring, preferably within a temperature range of from about 20° to 55° C. The organic solvent optionally used may, if it has a boiling point below the boiling point of water, be removed by distillation after components (i) and (ii) have been mixed together or after addition of the total quantity of water but in many cases removal of the solvent by distillation is unnecessary, especially if only small quantities of solvent are used. Bringing together of components (i) and (ii) results in this case in the spontaneous formation of high molecular weight, ionically modified polyurethanes, either as a solution or already as a dispersion, depending upon the quantity of water present at that stage. Any solutions present in predominantly organic solvents may be converted into an aqueous dispersion by the addition of further quantities of water. If ionic dihydroxy compounds are used as component (ii) the reaction is preferably carried out in the organic phase at about 20° to 150° C., preferably at about 40° to 120° C. If the reaction is carried out in organic solution the resulting solution of the ionic polyurethane is converted into a dispersion by admixing the solution with water and optionally by subsequent removal of the solvent. If the reaction is carried out in the melt the resulting ionic urethane is preferably dissolved in a solvent as exemplified hereinbefore with subsequent conversion of the resulting solution into a dispersion as explained hereinbefore. The total quantity of water used is generally the amount required to form dispersions having a solid content of from about 30 to 70% by weight.

the aqueous dispersions obtainable by the process according to the invention and the sheet products produced from these dispersions are found to have the following remarkable advantages compared with the corresponding dispersions prepared according to the known art and the sheet products produced from them:

1. The dispersions obtained according to the invention are in a more finely divided form and therefore have greater stability in storage and a better film-forming capacity compared to dispersions having the same content of ionic groups but which have been prepared by the known processes of the art.

2. The sheet products produced from the dispersions have less tendency to swell in water.

3. The sheets or foils obtained have a greater elasticity, as shown from the reduced tension values at 100% and 300% elongation.

The dispersions obtained according to the invention may be used wherever aqueous dispersions of anionically modified polyurethanes have previously been used.

The examples given below serve as a further illustration of the process according to the invention. All percentages refer to percentages by weight unless otherwise stated.

EXAMPLES

Example 1

Preparation of an isocyanate prepolymer:

2021 g (1.0 mol) of an anhydrous polyether of tetrahydrofuran was reacted with 289.6 g (1.723 mol) of hexamethylenediisocyanate (HDI) at 110° C. in a nitrogen atmosphere to produce an isocyanate prepolymer having an isocyanate content of 61.7 mmol/100 g (=2.618%). The free HDI content was determined by gel chromatography to be 2.4%.

Thin layer distillation of the isocyanate prepolymer:

The isocyanate prepolymer was subjected to thin layer distillation to remove unreacted HDI. Particulars concerning the procedure of thin layer distillation are given in Table 1. The free HDI content after thin layering was 1.1%. The determination was again carried out by gel chromatography.

Preparation of the dispersion:

The thin layered isocyanate prepolymer was used in five separate tests, in which in each case 182.3 g of the distilled prepolymer dissolved in 284.4 g (=360 ml) of acetone were reacted with different quantities of N-(2-aminoethyl)-2-aminoethane sulphonic acid sodium (AAS-Na) at 45° C. The AAS-Na was in the form of an aqueous solution in each case containing 36 ml of water. The quantities of AAS-Na used in the different tests were as follows: (1a)=3.77 g (19.8 mmol); (1b)=2.86 g (15.0 mmol); (1c)=2.40 g (12.6 mmol); (1d)=2.16 g (11.4 mmol) and (1e)=1.98 g (10.5 mmol). 344 g of water were added in each case for dispersion at 45° C. with stirring so that after removal of the acetone by distillation in the rotary evaporator, the dispersions obtained had a solid content of about 35%. The rate of addition of water was 10.6 g per minute. Characteristic properties of the latices and of the foils obtained after drying are summarized in Table 2.

Example 2

Preparation of an isocyanate prepolymer:

This was carried out as described in Example 1.

Thin layering of the isocyanate prepolymer:

In order to obtain as far as possible quantitative removal of unreacted HDI, 8 m-% of n-hexadecane was added to the isocyanate prepolymer as carrier to reduce the viscosity. After thin layering, the proportion of free HDI determined by gel chromatography was found to be 0.1% and that of hexadecane 0.5%.

Formation of the dispersion:

The thin layered prepolymer was reacted with differing quantities of AAS-Na as described in Example 1. The quantities of AAS-Na used for 182.3 g of isocyanate prepolymer in the different tests were as follows: (2a)–(2c) as for (1a)–(1c) in Example 1; (2d): 1.98 g (10.5 mmol); (2e)=1.62 g (8.53 mmol); (2f)=1.27 g (6.68 mmol) and (2g)=0.92 g (4.84 mmol). The solid content in these dispersions was again adjusted to 35%. The time required for removal of the acetone by evaporation increased with decreasing quantity of AAS-Na, i.e. with increasing particle diameter. Characteristic properties of the latices and of the foils obtained from them are summarized in Table 3.

From Tables 2 and 3 it may be seen that when thin layered isocyanate prepolymers are used, very low concentrations of ions are required for producing stable dispersions. The range of particle sizes is only insignificantly increased by reducing the ion concentration, as may be seen from the values given for $U_{80}$. Swelling of the foils in water decreases significantly with increasing ion concentration.

Example 3 (Comparison experiment)

Preparation of the isocyanate prepolymer was carried out as described in Example 1. 182.3 g of the prepolymer dissolved in 284.4 g (360 ml) of acetone were reacted with a solution of 3.77 g (19.8 mmol) of AAS-Na in 36 ml of water at 45° C. without previous thin layer distillation.

Dispersion was carried out as described in Example 1. Characteristic properties of this dispersion and of the foils obtained from it are shown for comparison in Tables 2 and 3.

As may be seen from Tables 2 and 3, the comparison dispersion contains substantially coarser particles than dispersions with the same ion concentration prepared from the thin layered prepolymers (dispersions (1a), (2a) and (3). This result is obtained from the specific surface areas and particle count per g of ionomer. As the free HDI present in the isocyanate prepolymer decreases, the particle size distribution becomes narrower as may be seen from the values given for $U_{80}$.

Example 4 (Dispersion with high solid content)

Example 4 is similar in procedure to Example (2f) but in this case a latex with a solid content of 60% and a Brookfield viscosity of 300 mPa.s/23° C. was obtained by removal of the water by evaporation. The latex was found to be stable in storage and showed no signs of coalescence even after 4 months at room temperature. The properties of the foils prepared from the latex are not influenced by the solid content.

Example 4 shows that dispersions with a high solid content may be obtained from thin layered isocyanate prepolymers.

TABLE 1

| Operating conditions in the thin layer process | | |
|---|---|---|
|  | Example 1 | Example 2 |
| Preheating of the crude product at | 60° C. | 60° C. |
| Temperatures in evaporator part | 118–121° C. | 131–133° C. |
| Pressure in mbar | 0.75 | 0.65–0.7 |
| Output in quantity in g min$^{-1}$ | 3.4 | 4.4 |
| Dwell time in evaporator part | 4–5 min. | 4 min. |
| Boiling point of the more volatile constituent | about 95° C. | about 100° C. |
| Thickness of product film on the surface of the evaporator jacket in mm$^a$ | 0.24 | 0.29–0.26 |
|  | 0.24 |  |
| Gas ballast (N$_2$ in countercurrent) in mbar | 0.18 | 0.18 |
| Speed of stirrer in min$^{-1b}$ | 1300 | 1300 |

$^a$Effective evaporator surface: 630 cm$^2$
$^b$2 stirrer blades

TABLE 2

Properties of the dispersions prepared according to Examples 1 and 3 and of the foils obtained after drying

| Example | (1a) | (1b) | (1c) | (1d) | (1e) | 3 |
|---|---|---|---|---|---|---|
| Free HDI[a]/% | 1.1 | 1.1 | 1.1 | 1.1 | 1.1 | 2.4 |
| [$SO_3^{31}$][b]/milliequ./100 g | 10.7 | 8.2 | 6.8 | 6.2 | 5.7 | 10.7 |
| Properties of latex | | | | | | |
| Solid content % | 35.1 | 35.1 | 35.1 | 35.1 | 35.1 | 35.9 |
| $\lambda^c$/mS cm$^{-1}$ | 1.66 | 1.53 | 1.31 | 1.15 | 1.03 | 1.82 |
| $\eta^d$/mPa.s (23° C.) | 110 | 69 | 19 | 13 | 17 | 69 |
| $D_7^e$/nm | 120 | 150 | 340 | 390 | 420 | 310 |
| Water-soluble $SO_3^-$ groups[f]/% | 22 | 19 | | | 24 | 61 |
| Properties of foils | | | | | | |
| $\delta$ 100[g]/N cm$^{-2}$ | 216 | 226 | 239 | 235 | — | 296 |
| $\delta$ 300[g]/N cm$^{-2}$ | 327 | 373 | 398 | 353 | 241 | 544 |
| Swelling in water $^wH_2O^h$ | 20.1 | 17.1 | 15.2 | 13.3 | 11.0 | 20.2 |

Legend to Table 2
[a] free HDI in the isocyanate prepolymer
[b] $SO_3^-$, based on the ionomer
[c] conductivity of the 35% latex at room temperature
[d] Brookfield viscosity of the 35% latex at room temperature (23° C.)
[e] particle diameter determined from turbidity measurements
[f] determined in the serum as H+ after freezing out the latex and cation exchange of the serum for H+
[g] tension values at 100 and 300% elongation at a speed of elongation 200%/min$^{-1}$
[h] mass break against $H_2O$ after swelling at room temperature, swelling time 16 d, thickness of foil 0.4–0.5 mm

TABLE 3

Properties of the latices prepared according to Example 2 and of the foils obtained from them after drying

| Example | (2a) | (2b) | (2c) | (2d) | (2e) | (2f) | (2g) | (3) |
|---|---|---|---|---|---|---|---|---|
| Free HDI[a]/% | 0.1 | 0.1 | 0.1 | 0.1 | 0.1 | 0.1 | 0.1 | 2.4 |
| [$SO_3^-$][b]/milliequ./100 g | 10.7 | 8.6 | 6.8 | 5.7 | 4.7 | 3.7 | 2.7 | 10.7 |
| Properties of latex | | | | | | | | |
| Solid/% | 35.0 | 35.0 | 35.1 | 34.9 | 34.9 | 34.9 | 35.0 | 35.9 |
| $\lambda^c$/mS cm$^{-1}$ | 1.35 | 1.17 | 1.07 | 0.94 | 0.77 | 0.51 | 0.46 | 1.82 |
| $\eta^d$/mPa.s | 151 | 34 | 9.4 | 8.5 | 7.7 | 9.6 | 10.2 | 69 |
| Water-soluble $SO_3^-$ groups[f]/% | 6 | | 5 | | | | | 61 |
| $D_{10}$ i/nm | 34.8 | 34.4 | 129 | 226 | 272 | | | 127 |
| $D_{50}$ i/nm | 42.0 | 45.2 | 194 | 302 | 408 | | | 192 |
| $D_{90}$ i/nm | 49.6 | 56.8 | 338 | 508 | 680 | | | 250 |
| $U_{80}$ | 0.35 | 0.50 | 0.56 | 0.93 | 0.99 | | | 0.64 |
| specific surface[i]/m$^2$ g$^{-1}$ | 131 | 123 | 30 | 18 | 14 | | | 30 |
| Particle count[j] · 10$^{-15}$ · g$^{-1}$ | 23.6 | 18.7 | 0.28 | 0.06 | 0.03 | | | 0.26 |
| Properties of foil | | | | | | | | |
| $\delta$ 100 g/N cm$^{-2}$ | 155 | 174 | 179 | 181 | 194 | 229 | 281 | 296 |
| $\delta$ 300 g/N cm$^{-2}$ | 198 | 213 | 234 | 271 | 308 | 393 | 470 | 544 |
| Swelling in water $^wH_2O^h$ | 26.5 | 17.8 | 13.2 | 11.2 | 9.7 | 8.2 | 6.6 | 20.2 |

For a–h see Table 2
[i] Particle diameter determined by ultracentrifugation, covering 10, 50 and 90% of the mass: $U_{80} = (D_{90} - D_{10})/D_{50}$
[j] values calculated from the particle size distribution
[k] dispersions (2f) and (2g) manifested coalescence after ca. 70 days at room temperature

Example 5

Preparation of a prepolymer:

289.6 g (1.723 moles) of hexamethylene diisocyanate (HDI) and 2025 g (1.0 mol) of polypropylene glycol are reacted for 10 hours at 110° C. Thereafter the NCO content is found to be 61.7 mmol/100 g. Excess HDI is removed in a thin film evaporator in accordance with example 1 so that the resulting isocyanate prepolymer has an NCO-content of less than 0.1%. The precise NCO-content of the prepolymer is found to be 37.4 mmol/100 g.

100 g of the NCO-prepolymer, dissolved in 153 g of acetone are reacted with 0.7 g (3.69 mmol) of AAS-Na, dissolved in 33.7 ml of water, for a reaction time of 40 minutes at a temperature of 45° C. Subsequently 153.3 g of water are added at 45° C. After removal of an acetone-water-mixture by distillation the solids content is found to be 43,3%. A further amount of water is then distilled off to obtain a dispersion with a solids content of 66.5%. The viscosity according to Brookfield of the dispersion is found to be 380 mPa s$^{-1}$ at 23° C., the concentration of ionic groups is found to be 0.0366 mmol $SO_3^{-1}$/g of solids.

Example 6

100 g of the prepolymer according to example 5 are reacted with 1.645 g of the propoxylation product of the adduct of sodium bisulfite and 1,4-dihydroxy-butene-(2) having a molecular weight of 425 which propoxylation product has previously been dissolved in toluene to form a 70% solution. The reaction is carried out 110° C. for a period of time of 140 minutes. The resulting reaction product is dissolved in 158 g of acetone and finally the solution thus obtained is admixed at 45° C. with 186 g of water. After removal of the acetone and a part of the water by distillation a dispersion is obtained having a solids content of 68.5%, a viscosity according to Brookfield of 1500 mPa s$^{-1}$ at 23° C. and a content of ionic groups of 0.038 mmol $SO_3^-$/g of solids.

Example 7

100 g of the NCO-prepolymer according to example 5 are reacted for 400 minutes at 50° C. with 1.918 g of the triethylammonium salt of dimethylol propionic acid which has previously been dissolved in acetone to form a 50% solution. Thereafter the reaction mixture is kept for 60 minutes at 70° C. 158 g of acetone are then added and finelly 186 g of water are added to the solution at 45° C. After removal of the acetone the solids content is found to be 37.5%. After addition of 82 ml of 0,1 m NaOH water and triethyl amine is distilled off until a solids contained of 55% is obtained. The viscosity of this dispersion is found to be 1350 mPa s$^{-1}$ (20° C.) the content of ions is found to be 0.080 mmol $COO^-$/g of solids.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an aqueous dispersion of a polyurethane containing chemically fixed carboxylate and/or sulphonate groups which comprises reacting
   (i) isocyanate prepolymers based on organic polyhydroxyl compounds and monomeric diisocyanates having an isocyanate content of from 1.5 to 8% by weight and containing less than 1.2% by weight of monomeric diisocyanate with
   (ii) a member selected from the group consisting of organic diaminocarboxylates, organic diaminosulphonates, organic dihydroxy carboxylates, organic dihydroxy sulphonates, organic dihydroxy carboxylic acids and organic dihydroxy sulphonic acids, and optionally other chain lengthening agents which have hydroxy or amino groups and which are free from salt groups and when said member is an organic dihydroxy carboxylic acid or an organic dihydroxy sulphonic acid, subsequently neutralizing the acid groups
wherein the reaction between components (i) and (ii) is conducted in the aqueous or organic phase optionally with subsequent addition of water and optionally subsequent removal of solvent, using an equivalent ratio of isocyanate groups to amino and/or hydroxy groups in the range of from about 1:1.2 to 1:0.05, optionally with the addition of further quantities of water, the nature and quantitative proportions of the reactants being chosen so that the resulting polyurethane has a carboxylate and/or sulphonate group content of from about 2 to 80 milliequivalents per 100 g of polyurethane solids.

2. The process according to claim 1, characterized in that the reactants (i) used are isocyanate prepolymers containing less than about 0.9% by weight of monomeric diisocyanate.

3. The process according to claim 1, characterized in that the nature and quantity of components (i) and (ii) are chosen so that the polyurethane has a carboxylate and/or sulphonate group content of from about 2.5 to 15 milliequivalents per 100 g of polyurethane solids.

4. The process according to claim 2, characterized in that the nature and quantity of components (i) and (ii) are chosen so that the polyurethane has a carboxylate and/or sulphonate group content of from about 2.5 to 15 milliequivalents per 100 g of polyurethane solids.

5. A process for the preparation of aqueous dispersions of polyurethanes containing chemically fixed carboxylate and/or sulphonate groups which comprises
   (a) preparing an isocyanate prepolymer having a monomeric diisocyanate content of at least 1.4% by weight,
   (b) reducing the monomeric diisocyanate content to less than 1.2% by weight
   (c) reacting the isocyanate prepolymer obtained in (b) with an organic diaminocarboxylate and/or an organic diaminosulfonate and optionally other chain lengthening agents which have amino groups and which are free from salt groups
in the aqueous or aqueous/organic phase, using an equivalent ratio of isocyanate groups to amino groups in the range of from about 1:1.2 to 1:0.05, optionally with the addition of further quantities of water, the nature and quantitative proportions of the reactants being chosen so that the resulting polyurethane has a carboxylate and/or sulphonate group content of from about 2 to 80 milliequivalents per 100 g of polyurethane solids.

6. The process of claim 5 which comprises reducing the monomeric diisocyanate content by treating the isocyanate prepolymer in a thin layer evaporator.

7. The process according to claim 6, characterized in that the reactants (i) used are isocyanate prepolymers containing less than about 0.9% by weight of monomeric diisocyanate.

8. The process of claim 6 wherein the reactants used in (c) are chosen so that the polyurethane has a carboxylate and/or sulphonate group content of from about 2.5 to 15 milliequivalents per 100 g of polyurethane solids.

9. The process of claim 7 wherein the reactants used in (c) are chosen so that the polyurethane has a carboxylate and/or sulphonate group content of from about 2.5 to 15 milliequivalents per 100 g of polyurethane solids.

10. A process for the preparation of an aqueous dispersion of a polyurethane containing chemically fixed carboxylate and/or sulphonate groups which comprises reacting
    (i) isocyanate prepolymers based on organic polyhydroxyl compounds and monomeric diisocyanates having an isocyanate content of from 1.5 to 8% by weight and containing less than 1.2% by weight of monomeric diisocyanate with
    (ii) an organic diaminocarboxylate and/or an organic diaminosulphonate and optionally other chain lengthening agents which have amino groups and which are free from salt groups
in the aqueous or aqueous/organic phase, using an equivalent ratio of isocyanate groups to amino groups in the range of from about 1:1.2 to 1:0.05, optionally with the addition of further quantities of water, the nature and quantitative proportions of the reactants being chosen so that the the resulting polyurethane has a carboxylate and/or sulphonate group content of from about 2 to 80 milliequivalents per 100 g of polyurethane solids.

11. A process for the preparation of an aqueous dispersion of a polyurethane containing chemically fixed carboxylate and/or sulphonate groups which comprises reacting
    (i) isocyanate prepolymers based on organic polyhydroxyl compounds and monomeric diisocyanates having an isocyanate content of from 1.5 to 8% by weight and containing less than 1.2% by weight of monomeric diisocyanate with
    (ii) a member selected from the group consisting of organic dihydroxy carboxylates, organic dihydroxy sulphonates, organic dihydroxy carboxylic acids and organic dihydroxy sulphonic acids, optionally other chain lengthening agents which have hydroxy or amino groups and which are free from salt groups and when said member is an organic dihydroxy carboxylic acid or an organic dihydroxy sulphonic acid, subsequently neutralizing the acid groups
wherein the reaction between components (i) and (ii) is conducted in the organic phase, using an equivalent ratio of isocyanate groups to amino and/or hydroxy groups in the range of from about 1:1.2 to 1:0.05, optionally with the addition of solvent followed by the addition of water and the optional removal of solvent, the nature and quantitative proportions of the reactants being chosen so that the resulting polyurethane has a carboxylate and/or sulphonate group content of from about 2 to 80 milliequivalents per 100 g of polyurethane solids.

* * * * *